United States Patent Office 3,072,724
Patented Jan. 8, 1963

3,072,724
PREPARATION OF β-KETOAMIDE FROM 2,2,4,4-TETRAALKYL-1,3-CYCLOBUTANEDIONE
Edward U. Elam and Robert H. Hasek, Kingsport, Tenn., assignors, to Eastman Kodak Company, Rochester, N.Y., a corporation of New Jersey
No Drawing. Filed June 17, 1960, Ser. No. 36,716
12 Claims. (Cl. 260—561)

This invention concerns the preparation of β-ketoamides, and more specifically, tetraalkylacetoacetamides.

Such β - ketoamides as N,N'-bis(tetraalkylacetoacetamides) and the like are useful in the preparation of polymeric Schiff bases and polyamides. β-Ketoamides have been prepared by the condensation of aliphatic amides with each other in the presence of sodium.

It is an object of this invention to provide a new method for preparing β-ketoamides.

It is another object of this invention to prepare tetraalkylacetoacetamides from cyclic diketones.

These and other objects of the invention are accomplished by reacting 2,2,4,4-tetraalkyl-1,3-cyclobutanedione with certain nitrogen-containing compounds as described in detail hereinafter.

The 2,2,4,4-tetraalkyl-1,3-cyclobutanedione reactant in the present process has the following formula

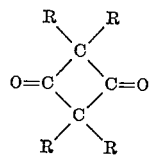

wherein R is an alkyl group having 1 to 4 carbon atoms. The alkyl radicals need not be the same on the 2,2,4,4-tetraalkyl-1,3-cyclobutanediones, such compounds as 2,4-dimethyl-2,4-diethylcyclobutane-1,3-dione and the like being included in the invention. Other 2,2,4,4-tetraalkyl-1,3-cyclobutanediones that can be suitably employed in the invention include such 2,2,4,4-tetraalkyldiones as the 2,2,4,4-tetramethyl dione, the 2,2,4,4-tetraethyl dione, the 2,4-dipropyl-2,4-diethyl dione, the 2,4-dimethyl-2,4-dipropyl dione, the 2,4-diethyl-2,4-dibutyl dione, etc.

In the present process a nitrogen-containing compound is reacted with a 2,2,4,4-tetraalkyl-1,3-cyclobutanedione. Suitable nitrogen-containing compounds include compounds having the formulas

and $H_2N-R'''-NH_2$ as well as pyrrolidine, piperidine and piperazine. The substituents R' and R'' are hydrogen atoms or alkyl radicals having 1 to 10, and preferably 1 to 6, carbon atoms, and the substituent R''' is an alkylene radical having 2 to 10, and preferably 2 to 6, carbon atoms. Typical nitrogen-containing reactants include such compounds as ammonia, methylamine, ethylamine, isopropylamine, n-butylamine, amylamine, n-heptylamine, 2-ethylhexylamine, n-octylamine, n-decyl amine, ethylenediamine, 1,3-propanediamine, 1,4-butanediamine, 1,5-pentanediamine, 1,6 - hexanediamine, 1,8-octanediamine, 1,10-decanediamine, dimethyl amine, diethyl amine, di-n-butyl amine, di-n-octyl amine, di-n-decylamine, and the like as well as pyrrolidine, piperidine and piperazine.

The 2,2,4,4-tetraalkyl-1,3-cyclobutanedione and the nitrogen-containing reactant are combined in a reactor and reacted under substantially anhydrous conditions. The proportions of these reactants can be varied in accordance with usual practice, although a stoichiometric excess of the nitrogen-containing reactant is preferably used as such excesses can be readily distilled or stripped off of the reaction product on completion of the reaction. The reaction temperature can vary within the range of about −20° C. to about 200° C., and preferably is varied within the range of 0° C. to 175° C. The temperature employed is varied depending upon the particular nitrogen-containing reactant utilized. Reaction temperatures of the order of 100° C. to 175° C. are desirably employed when the nitrogen-containing reactant is ammonia, although lower temperatures can be utilized. Temperatures higher than those necessary to complete the reaction in a reasonable time are generally not utilized in accordance with usual chemical practice, high temperatures in the present instance tending to decompose the tetraalkylacetoacetamide product to diisopropyl ketone and ureas. Likewise, the pressure under which the subject reaction can be effected can be widely varied in accordance with usual practice, including atmospheric, depressed or elevated pressures. Typical reaction times vary between about 1 hour to 15 hours, or even as long as 2 or 3 days, depending on the reaction temperature and the type of amine used. However, longer or shorter reaction periods can be utilized.

The reaction of 2,2,4,4-tetraalkyl-1,3-cyclobutanedione with the above-described nitrogen-containing reactant utilized in the subject process proceeds in high yields to form a tetraalkylacetoacetamide. Excess or unreacted ammonia or amine is desirably evaporated, distilled or stripped off the reaction mixture. The tetraalkylacetoacetamide can be worked up or purified by conventional purification methods. A particularly effective method for purifying the reaction product is crystallization from an inert organic solvent such as cyclohexane, benzene, hexane, pentane, toluene and the like, and the reaction product readily separated therefrom, the solvent being conveniently the reaction solvent.

When an amine having the formula

is reacted with 2,2,4,4-tetramethyl-1,3-cyclobutanedione a 2,2,4-trimethyl-3-oxovaleramide results, such a compound having the formula

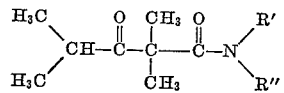

R' and R'' being hydrogen atoms or alkyl radicals as described above. Similarly pyrrolidine and piperidine, when reacted with 2,2,4,4-tetramethyl-1,3-cyclobutanedione, form compounds having the formulas

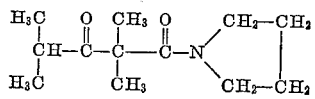

and

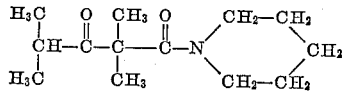

respectively. When a diamine having the formula $H_2N-R'''-NH_2$ is reacted with 2,2,4,4-tetramethyl-1,3-cyclobutanedione a N,N'-alkylenebis(2,2,4-trimethyl-3-oxovaleramide) results, such a compound having the formula

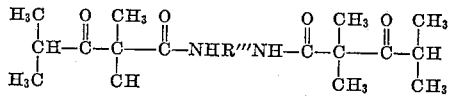

R''' being an alkylene radical as described above. Likewise, piperazine, when reacted with 2,2,4,4-tetramethyl- 1,3-cyclobutanedione, forms a compound having the formula

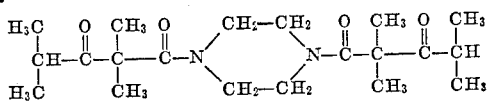

Thus, in accordance with the present process a cyclic compound, a 2,2,4,4-tetraalkyl-1,3-cyclobutanedione, reacts with certain amines to form the above-described β-ketoamides.

That the present reaction proceeds in the described manner is quite surprising in view of the prior art teachings and the manner in which other closely related compounds react. For example, Wedekind and Miller, Berichte, 43, 834 (1910), disclosed the reaction of tetramethyl-1,3-cyclobutanedione with aqueous ammonia to form an imine, the Wedekind and Miller reaction being represented by the following equation:

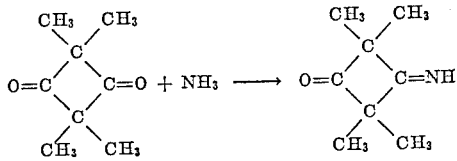

However, we have found that if substantially anhydrous conditions are employed with ammonia, the subject substituted carbocyclic ring is split to form tetraalkylacetoacetamides rather than imines. Further, we have found that aromatic amines such as aniline do not react with the present alkyl substituted cyclobutanediones to form β-ketoamides or tetraalkylacetoacetamides, but rather react to form Schiff bases, this being represented by the following equation:

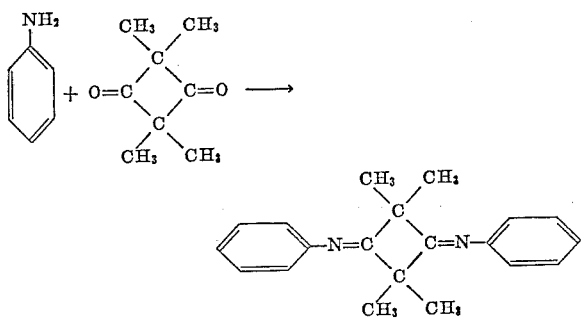

However, we have found that when certain aliphatic amines as described above are employed, tetraalkylacetoacetamides result rather than Schiff bases.

The invention is illustrated by the following examples of preferred embodiments thereof.

Example 1

A mixture of 100 grams of 2,2,4,4-tetramethyl-1,3-cyclobutanedione, 500 ml. of cyclohexane, and 50 ml. of anhydrous ammonia was placed in a one liter stainless steel autoclave and heated at 150° C. for 2.5 hours under substantial anhydrous conditions. The resulting reaction product was removed from the autoclave and the crystalline material recovered by filtration to give 96.3 grams (85.7% yield) of 2,2,4-trimethyl-3-oxovaleramide melting from 106–9° C.

Analysis.—Calcd. for $C_8H_{15}NO_2$: C, 61.1; H, 9.56; N, 8.92. Found: C, 61.26; H, 9.83; N, 9.19.

Example 2

Seventy grams (0.5 mole) of 2,2,4,4-tetramethyl-1,3-cyclobutanedione were cautiously added to a solution of 45 grams (1 mole) of ethylamine in 200 ml. of benzene, the mixture being kept under substantially anhydrous conditions. There was no apparent heat of reaction and no water separated, but the dione went into solution rapidly. The solution was left in a loosely stoppered flask overnight (about 15 hours), and then heated on the steam bath to remove the excess ethylamine and some of the benzene solvent. The resulting residue crystallized on cooling, the crystals were separated by filtration, and then recrystallized once from hexane to give 75 grams of N-ethyl-2,2,4-trimethyl-3-oxovaleramide melting from 50–53° C.

Analysis.—Calcd. for $C_{10}H_{19}NO_2$: C, 64.9; H, 10.28; N, 7.56. Found: C, 64.87; H, 10.40; N, 7.34.

Example 3

A 1 mole portion of N-butylamine and a 0.5 mole portion of 2,2,4,4-tetramethylcyclobutanedione were reacted as described in Example 2. The yield of N-butyl-2,2,4-trimethyl-3-oxovaleramide melting from 30–31° C. after recrystallization from pentane was 68.5 grams (64% yield).

Analysis.—Calcd. for $C_{12}H_{23}NO_2$: C, 67.6; H, 10.8; N, 6.57. Found: C, 67.07; 67.22; H, 10.88, 10.86; N, 6.58.

Example 4

A 0.15 mole portion of ethylenediamine and a 0.18 mole portion of 2,2,4,4-tetramethyl-1,3-cyclobutanedione were reacted as described in Example 2 to give N,N'-ethylenebis(2,2,4-trimethyl - 3 - oxovaleramide) which melted from 107–8° C.

Analysis.—Calcd. for $C_{18}H_{30}N_2O_4$: C, 63.5; H, 9.4; N, 8.24. Found: C, 63.8; H, 9.45; N, 8.22.

The prepared N,N'-ethylenebis(2,2,4-trimethyl-3-oxovaleramide) has utility in the preparation of polymeric materials. A mixture of 6.8 g. (0.02 mole) of the prepared amide, 3.96 g. (0.02 mole) of 4,4'-methylenebisaniline, 50 ml. of 1,2-diethoxyethane, and 0.1 g. of p-toluenesulfonic acid was refluxed for 2 hours. Water that formed was removed by distillation. After the reaction was complete, the polymeric material which had separated from the reaction mixture was recovered by decantation. A film cast from the separated polymer was clear, hard and flexible.

Example 5

A 100 gram portion of 2,2,4,4-tetraethyl-1,3-cyclobutanedione was reacted with 50 ml. of ammonia as described in Example 1. The 2,2,4-triethyl-3-oxohexanamide which was obtained boiled from 144–6° C. at 2 mm. of mercury and melted at 94° C. after recrystallization from aqueous ethanol.

Analysis.—Calcd. for $C_{12}H_{23}NO_2$: C, 67.6; H, 10.8; N, 6.58. Found: C, 67.48; H, 10.93; N, 6.70.

Example 6

A mixture of 70 g. (0.5 mole) of 2,2,4,4-tetramethyl-1,3-cyclobutanedione and 35.5 g. (0.5 mole) of pyrrolidine was heated and stirred under a reflux condenser overnight on the steam bath. Distillation of the reaction solution through an 18-inch packed column gave 56.4 g. of 1-(3-oxo-2,2,4-trimethylvaleryl)pyrrolidine, B.P. 132–134° C. (2.6 mm.), $n_D^{20}$ 1.4798.

Analysis.—Calcd. for $C_{12}H_{21}NO_2$: C, 68.2; H, 10.0; N, 6.6. Found: C, 68.0; H, 9.8; N, 6.6.

Example 7

A mixture of 140 g. (1 mole) of 2,2,4,4-tetramethyl-1,3-cyclobutanedione and 85 g. (1 mole) of piperidine was refluxed with stirring. The initial temperature in the base heater was 120° C., but after 27 hr. the temperature had risen to 160° C. The solution was heated at 150–155° C. for an additional 24 hr. Distillation of the reaction solution through an 18 inch packed column gave 169.2 g. (75% conversion) of 1-(3-oxo-2,2,4-trimethylvaleryl)piperidine, B.P. 134–136° C. (2.1 mm.), $n_D^{20}$ 1.4831.

Analysis.—Calcd. for $C_{13}H_{23}NO_2$: C, 69.4; H, 10.2; N, 6.2. Found C, 69.4; H, 10.0; N, 6.1.

Example 8

Piperazine was substituted for the piperidine in the process described in Example 7 and reacted similarly to give a 31% yield of N,N'-bis(2,2,4-trimethyl-3-oxovaleryl) piperazine, M.P. 178–9° C.

*Analysis.*—Calcd. for $C_{20}H_{34}N_2O_4$: C, 65.6; H, 9.29; N, 7.65. Found C, 65.2; H, 9.38; N, 7.46.

Example 9

A mixture of 210 g. (1.5 moles) of 2,2,4,4-tetramethyl-1,3-cyclobutanedione and 117 g. (1.6 moles) of diethylamine was heated in a rocking autoclave at 160° C. for 3 days. After the reaction mixture was cooled, unreacted tetramethyl-1,3-cyclobutanedione was removed by filtration. The filtrate was distilled through a 12-inch Vigreux column to obtain 35.3 g. of N,N-diethyl-2,2,4-trimethyl-3-oxovaleramide, B.P. 104–108° C. (3 mm.).

*Analysis.*—Calcd. for $C_{12}H_{23}NO_2$: C, 67.6; H, 10.8; N, 6.6. Found: C, 67.7; H, 10.7; N, 6.4.

The present invention thus provides a convenient method for preparing tetraalkylacetoacetamides. The process of the invention is effected with readily available reactants under conventional reaction conditions. Further, the present process is high yielding and the product can be readily separated from the reaction mixture. Hence, the present invention is a commercially useful process and a contribution to the art.

Although the invention has been described in considerable detail with reference to certain preferred embodiments thereof, it will be understood that variations and modifications can be effected within the spirit and scope of the invention as described hereinabove and as defined in the appended claims.

This application is a continuation-in-part of application Serial Number 834,667, filed August 19, 1959, now abandoned.

We claim:

1. The process which comprises reacting a 2,2,4,4-tetraalkyl-1,3-cyclobutanedione having the formula

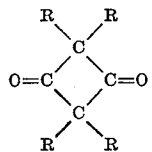

wherein R is an alkyl radical having 1 to 4 carbon atoms with a nitrogen-containing compound selected from the group consisting of compounds having the formulas

$H_2N$—$R'''$—$NH_2$, pyrrolidine, piperidine and piperazine wherein R' and R" are selected from the group consisting of hydrogen atoms and alkyl radicals having 1 to 10 carbon atoms, and R''' is an alkylene radical having 2 to 10 carbon atoms to form an amide having the formula

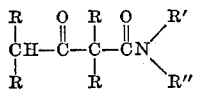

when the said nitrogen-containing reactant has the formula

an amide having the formula

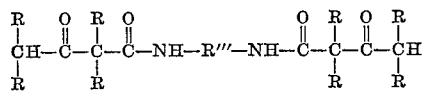

when the said nitrogen-containing reactant has the formula $H_2N$—$R'''$—$NH_2$, an amide having the formula

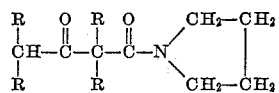

when the said nitrogen-containing reactant is pyrrolidine, an amide having the formula

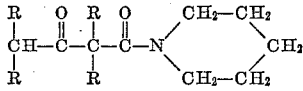

when the said nitrogen-containing reactant is piperidine, and an amide having the formula

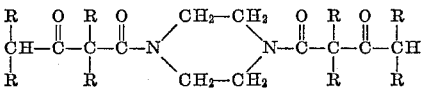

when the said nitrogen-containing reactant is piperazine, said reaction being effected under substantially anhydrous conditions at a temperature in the range of 100° C. to 200° C.

2. The process which comprises reacting a 2,2,4,4-tetraalkyl-1,3-cyclobutanedione having the formula

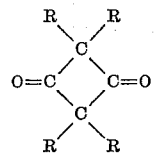

wherein R is an alkyl radical having 1 to 4 carbon atoms with an amine having the formula

wherein R' and R" are selected from the group consisting of alkyl radicals having 1 to 10 carbon atoms and hydrogen atoms under substantially anhydrous conditions at a temperature in the range of 100° C. to 175° C. and forming an amide having the formula

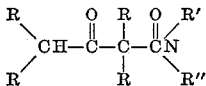

3. The process which comprises reacting a 2,2,4,4-tetraalkyl-1,3-cyclobutanedione having the formula

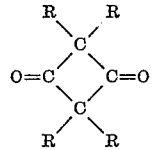

wherein R is an alkyl radical having 1 to 4 carbon atoms with an amine having the formula $H_2N$—$R'''$—$NH_2$ wherein R''' is an alkylene radical having 2 to 10 carbon atoms under substantially anhydrous conditions at a temperature in the range of 100° C. to 175° C. and forming an amide having the formula

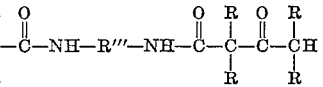

4. The process which comprises reacting a 2,2,4,4-tetraalkyl-1,3-cyclobutanedione having alkyl radicals with 1 to 4 carbon atoms with ammonia under substantially anhydrous conditions at a temperature in the range of 100° C. to 175° C. and forming a 2,2,4-trialkyl-3-oxovaleramide.

5. The process which comprises reacting a 2,2,4,4-tetraalkyl-1,3-cyclobutanedione having alkyl radicals selected from the group consisting of methyl radicals and ethyl radicals with ammonia under substantially anhydrous conditions at a temperature in the range of 100° C. to 175° C. and forming a 2,2,4-trialkyl-3-oxovaleramide.

6. The process which comprises reacting 2,2,4,4-tetramethyl-1,3-cyclobutanedione with an amine having the formula R'—NH$_2$ wherein R' is an alkyl radical having 1 to 6 carbon atoms under substantially anhydrous conditions at a temperature in the range of 100° C. to 175° C. and forming a N-alkyl-2,2,4-trimethyl-3-oxovaleramide.

7. The process according to claim 6 wherein the amine is ethylamine.

8. The process according to claim 6 wherein the amine is n-butylamine.

9. The process which comprises reacting 2,2,4,4-tetramethyl-1,3-cyclobutanedione with a diamine having the formula H$_2$N—R''—NH$_2$ wherein R'' is an alkylene radical having 2 to 6 carbon atoms under substantially anhydrous conditions at a temperature in the range of 100° C. to 175° C. and forming a N,N'-alkylenebis(2,2-4-trimethyl-3-oxovaleramide).

10. The process according to claim 9 wherein the diamine is ethylenediamine.

11. The process which comprises reacting 2,2,4,4-tetramethyl-1,3-cyclobutanedione with an amine having the formula

wherein R' and R'' are alkyl radicals having 1 to 6 carbon atoms under substantially anhydrous conditions at a temperature in the range of 100° C. to 175° C. and forming a N,N-dialkyl-2,2,4-trimethyl-3-oxovaleramide.

12. The process according to claim 11 wherein the amine is diethylamine.

References Cited in the file of this patent

UNITED STATES PATENTS

| | | |
|---|---|---|
| 1,982,675 | Law | Dec. 4, 1934 |
| 2,152,132 | Boese | Mar. 28, 1939 |
| 2,174,239 | Gleason | Sept. 26, 1939 |
| 2,462,358 | Caldwell | Feb. 22, 1949 |
| 2,824,884 | Barnhart et al. | Feb. 25, 1958 |

FOREIGN PATENTS

| | | |
|---|---|---|
| 429,982 | Great Britain | June 11, 1935 |

OTHER REFERENCES

Rice et al.: Journal of the American Chemical Society, vol. 65, pages 1677–1681 (1943).